United States Patent [19]

Tokunaga et al.

[11] Patent Number: 4,650,995

[45] Date of Patent: Mar. 17, 1987

[54] REFLECTION TYPE OPTICAL ROTARY ENCODER

[75] Inventors: Ichiro Tokunaga; Yoji Shimojima, both of Furukawa, Japan

[73] Assignee: Alps Electric Co., Ltd., Japan

[21] Appl. No.: 692,288

[22] Filed: Jan. 16, 1985

[30] Foreign Application Priority Data

Jan. 18, 1984 [JP] Japan .................................. 59-4176

[51] Int. Cl.⁴ ............................................ G01D 5/34
[52] U.S. Cl. ................................ 250/231 SE; 324/175
[58] Field of Search ............ 250/231 SE, 227, 237 G;
356/395; 340/347 P; 324/175

[56] References Cited

U.S. PATENT DOCUMENTS 4,033,698 7/1977 Demsky et al. .................. 250/227 X Primary Examiner—Eugene R. LaRoche
Assistant Examiner—Robert J. Pascal
Attorney, Agent, or Firm—Guy W. Shoup

[57] ABSTRACT

In a reflecting type optical rotary encoder capable of detecting a number of rotation and rotating direction of a code wheel by projecting light emitted from a light emitting element onto reflecting portions provided on the code wheel through a first optical fiber, and by guiding light reflected from the reflecting portions into light receiving elements through second optical fibers, end portions adjacent to the code wheel of the first and second optical fibers are brought into abutment with each other, and an angle substantially equal to 90° is formed between an end surface and a side surface of each of the second optical fibers.

2 Claims, 7 Drawing Figures

REFLECTION TYPE OPTICAL ROTARY ENCODER

BACKGROUND OF THE INVENTION

1. Field of the Invention

This invention relates to a reflection type optical rotary encoder, and more particularly to a type thereof wherein optical fibers are utilized between the upper surface of a code wheel and light emitting and light receiving elements.

2. Description of Prior Art

FIG. 1 illustrates a typical construction of a prior art rotary encoder wherein a code wheel 2 of a disc shape is mounted on a rotating shaft 1a of a motor 1. On the upper surface 2a of the code wheel 2 are radially disposed sector-shaped reflecting portions 3 equally spaced apart from each other, and nonreflecting portion 4 interposed between the reflecting portions 3. Opposing to the upper surface 2a of the code wheel 2, there are provided a light emitting element 5 and two light receiving elements 6 and 7 which are arranged on both sides of the light emitting element 5. Optical fibers 8, 9 and 10 are extended between the elements 5, 6 and 7 and the code wheel 2, respectively. When the code wheel 2 is rotated, the light emitted from the light emitting element 5 is reflected by the reflecting portions 3, and received in the light receiving elements 6 and 7 thereby providing continuous pulse signals, from which the number of rotations and the rotating direction of the code wheel 2 can be detected.

Heretofore, the first optical fiber 8 that transmits the light emitted from the light emitting element 5, and the second optical fibers 9 and 10 that transmit the light received by the light receiving elements 6 and 7, have end portions facing the code wheel 2 shaped as shown in FIG. 4(b). That is, the ends of the first optical fiber 8 and the second optical fibers 9 and 10 are held in abutment so as to collect light reflected from the code wheel 2 efficiently, and formed into a planar surface extending in parallel with the code wheel 2.

More specifically, the angle K formed between the side surfaces of the second optical fibers 9 and 10 and the planar surface is smaller than 90°.

Such an arrangement has entailed a difficulty of the second optical fiber 9 hardly receiving the light G emitted from the first optical fiber 8 and reflected from the upper surface 2a of the code wheel 2 at an angle S.

Furthermore, when a reflection by the end surface of the optical fiber is considered, the light H emitted from the first optical fiber 8 which is reflected from the upper surface of the code wheel 2 reaches the end surface of the second optical fiber 10. At this time, since the refraction index of the optical fiber is different from that of air, one part of the light H is again reflected by the end surface of the second optical fiber 10. Since the incident angle $\beta$ of this light H at this time is comparatively large, a large part of the light H tends to be reflected by the end surface of the optical fiber 10, thus lowering the light collecting efficiency of the conventional rotary encoder.

SUMMARY OF THE INVENTION

An object of the present invention is to provide a reflecting type optical rotary encoder wherein the above described difficulties of the conventional encoder can be substantially eliminated, and the light collecting property far better than that of the conventional construction can be exhibited.

The above described and other objects of the present invention can be achieved by a reflecting type optical rotary encoder wherein end portions, adjacent to the code wheel, of the first optical fiber used for the light emitting element and of the second optical fibers used for the light receiving elements are brought into abutment with each other, and an angle substantially equal to 90° is formed between the end surface of each of the second optical fibers and the side surface of the same.

DESCRIPTION OF THE PREFERRED EMBODIMENT

A preferred embodiment of the present invention will now be described with reference to FIGS. 2, 3, 4(a), 5(a) and 5(b).

Figure 1:
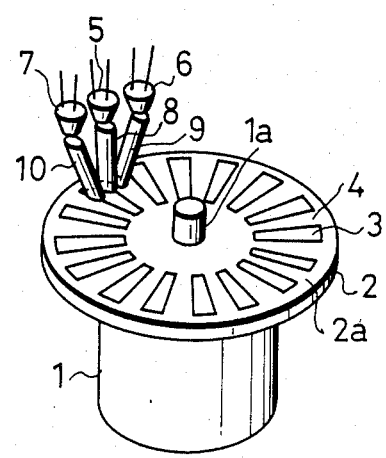
FIG. 1 is a perspective view showing a conventional reflecting type optical rotary encoder.
Figure 2:
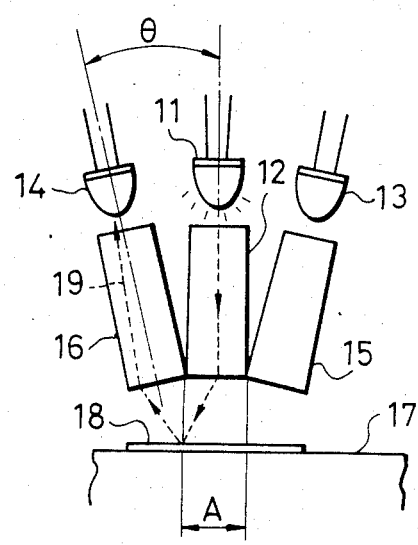
FIG. 2 is a diagram showing a reflecting type optical rotary encoder according to the present invention.

In FIG. 2, there is illustrated a reflecting type optical rotary encoder constituting the preferred embodiment which comprises a light emitting element 11, a first optical fiber 12 transmitting the light emitted from the light emitting element 11 to a code wheel 17, and second optical fibers 15 and 16 which transmit light received in the second optical fibers 15 and 16 toward light receiving elements 13 and 14, respectively. End portions (adjacent to the code wheel 17) of the first and second optical fibers are brought into abutment with each other, and an angle of substantially equal to 90° is formed between the end surface and the side surface of each of the second optical fibers. Numeral 19 designates a light receiving path.

As is well known in the art, by providing optical fibers between the light emitting and light receiving elements and the code wheel as described above, the distance between the centers of the light emitting element and the light receiving element can be reduced as desired. Furthermore, when two different phases are required to be read out, setting of the two phases can be effected arbitrarily at high precision.

Figure 3:
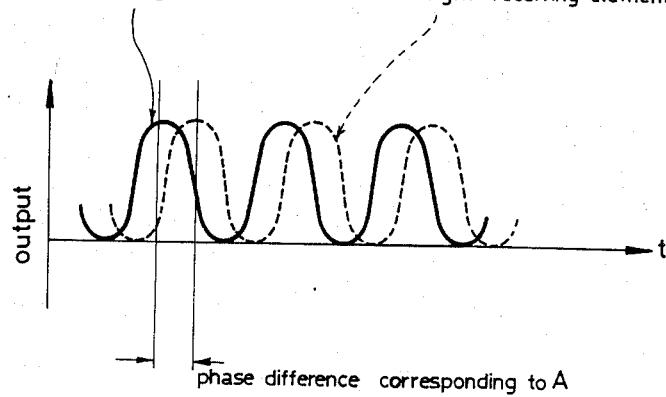
FIG. 3 is a waveform diagram showing output property of the encoder.

FIG. 3 illustrates waveforms of the output signals obtained from the light receiving elements 13 and 14 of the optical encoder according to the present invention. As is apparent from FIG. 3, there is a phase difference between the output signals.

Other than the above described advantageous features caused by the optical fibers between the elements and the code wheel, more remarkable feature of the invention resides in the configuration of the end portions of the optical fibers.

Figure 4A:
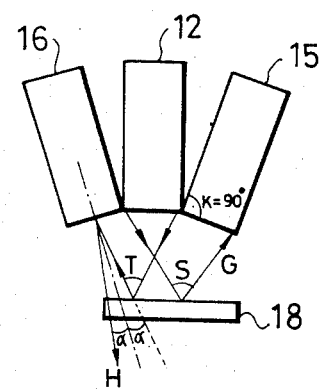
FIG. 4(a) is a diagram for explaining light paths in the present invention.

More specifically, as shown in FIG. 4(a), the angle between the end surface and the side surface of each of the second optical fibers is made substantially equal to 90°.

As a consequence, a light ray G delivered from the first optical fiber 12 and reflected by a reflecting plate 18 at an angle S can be received by one of the second optical fibers 15.

Figure 4B:
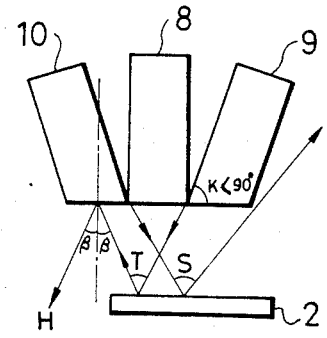
FIG. 4(b) is a diagram for explaining light paths in the conventional rotary encoder.

Furthermore, when a reflected light ray H is considered, since the incident angle $\alpha$ of the same is smaller than the incident angle $\beta$ of the case shown in FIG. 4(b), the amount of the reflected light can be far more reduced than the case of FIG. 4(b). That is, the light receiving property of the second optical fibers can be much improved by the above described configuration of the end portions.

Figure 5A:
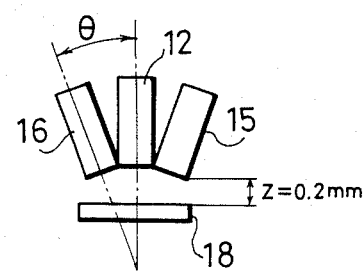
FIG. 5(a) is a diagram showing an inclination angle $\theta$ formed between optical fibers.
Figure 5B:
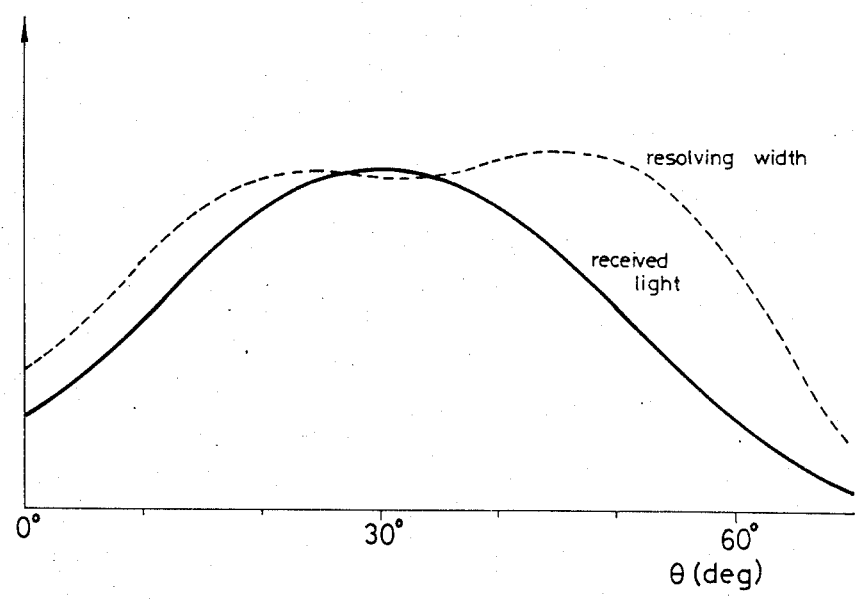
FIG. 5(b) is a graph indicating relations between the inclination angle $\theta$ and incident light and resolution of the rotary encoder.

FIG. 5(a) illustrates an angle $\theta$ formed between the first and second optical fibers, while FIG. 5(b) illustrates light receiving property and resolution of the encoder which are varied by the angle $\theta$ (solid line indicates the light receiving property, and broken line indicates the resolution).

As is apparent from FIGS. 5(a) and 5(b), the maximum amount of light can be received at $\theta = 30°$. However, since the resolving width also becomes large at this value of $\theta$, the resolution of the encoder is reduced. On the other hand, when $\theta = 5°$, the resolution is much improved, while the amount of received light is reduced to approximately ½ of the value at the time of $\theta = 30°$. Thus, it is apparent that by adjusting the angle $\theta$ suitably, the amount of received light and the resolution can be varied as desired.

According to the present invention, an optical rotary encoder of a reflecting type utilizing optical fibers and having a high light collecting property can be realized by a simple construction of the encoder.

What is claimed is:

1. In a reflection type optical rotary encoder capable of detecting the rotation and direction of a rotating code wheel having on a detection surface thereof at least one reflecting element, said encoder including an individual light emitting optical fiber having a light emitting end closely spaced apart by a small gap and facing opposite the direction surface of the code wheel, and individual light receiving optical fibers disposed around the light emitting optical fiber having light receiving ends closely spaced apart by the gap and facing opposite the detection surface to receive light emitted from the light emitting optical fiber and reflected from the reflecting element on the detection surface, the improvement wherein the light emitting optical fiber end is oriented perpendicular to the detection surface, the light receiving optical fibers ends are arranged abutting with and oriented at a selected acute angle to the light emitting optical fiber end, and each end of the light receiving optical fibers has an end surface and side walls which are substantially perpendicular to each other and said end surface is oriented at said acute angle to said reflecting surface so as to be non-parallel therewith.

2. A reflecting type optical rotary encoder according to claim 1, wherein the acute angle in a range of from 0° to 30° for obtaining a desired light receiving property and a desired light resolution property.

* * * * *